Oct. 25, 1955   B. M. WOJCIECHOWSKI   2,721,975
GROUNDED CAPACITANCE MEASURING SYSTEM
Filed Sept. 10, 1952
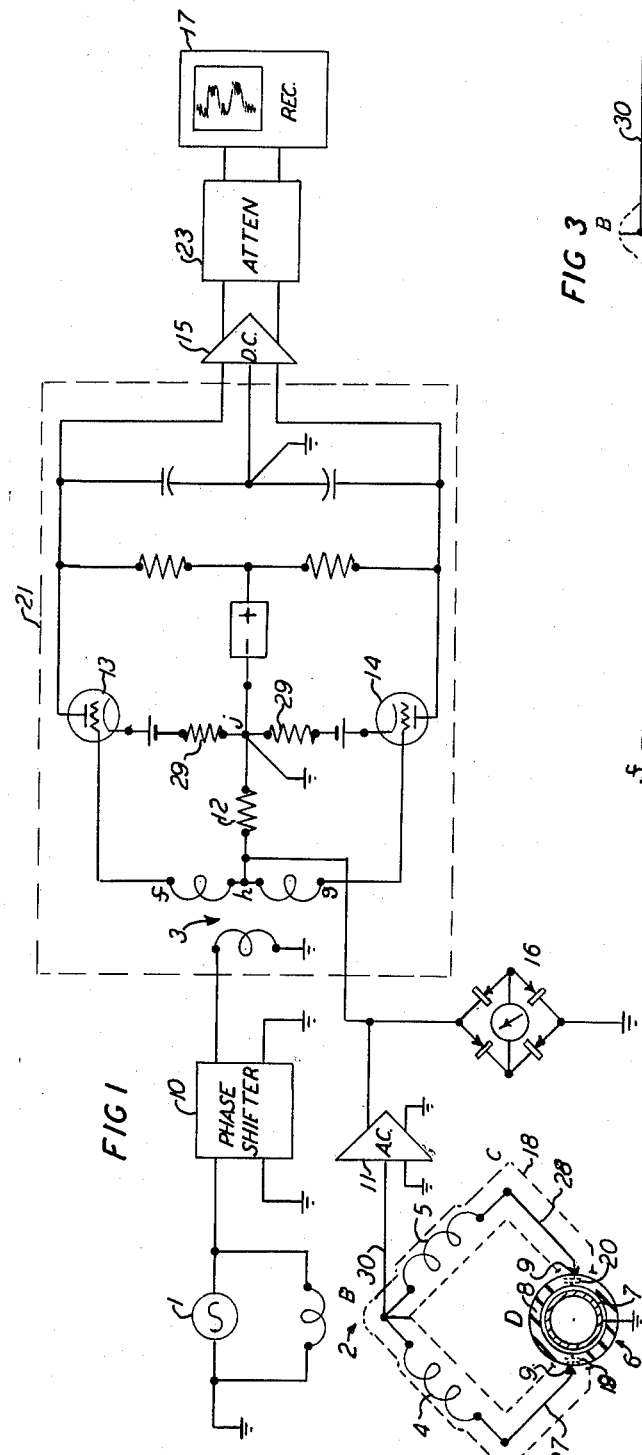
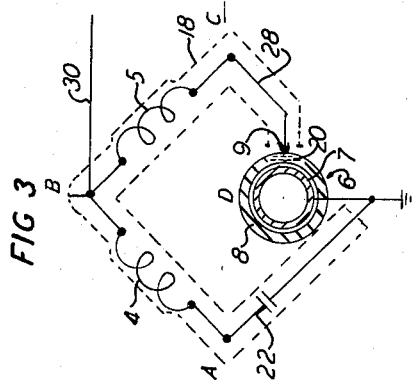
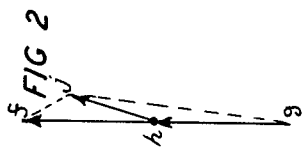
INVENTOR
B. M. WOJCIECHOWSKI
BY
ATTORNEY

2,721,975

Patented Oct. 25, 1955

2,721,975

GROUNDED CAPACITANCE MEASURING SYSTEM

Bogumil M. Wojciechowski, New York, N. Y., assignor to Western Electric Company, Incorporated, New York, N. Y., a corporation of New York Application September 10, 1952, Serial No. 308,877

8 Claims. (Cl. 324—61)

This invention relates to a system for determining the eccentricity and thickness of insulating covering on a metal tube or sheath and particularly to a system utilizing an A. C. impedance bridge for making such determinations.

In the manufacture of cables covered with insulating material such as polyethylene, due to the unavoidable variations in the thickness of the material applied, a serious problem has been the control of the eccentricity and thickness of this covering. Eccentric cables are subject to breaking when bent as a result of the peculiar concentration of strains on the thinner sides; excessive thickness results in wasting an expensive material as well as adding weight while insufficient thickness decreases the life and also the mechanical strength of the cable.

To applicant's knowledge, no reliable non-destructive system or method has been available for measuring eccentricity and thickness for controlling the application of the material on the cable.

Known systems utilizing capacitance measurements have not been practicable for making these measurements during the processing of the cable since the equipment used to form the metal sheath cannot be isolated from ground potential so that only capacitance to ground measurements are involved. In known circuits, grounded capacitance measurements are inherently subjected to large errors as a result of stray capacitances to ground, large residual capacitances of the measuring circuit and variations in the leads.

It is, therefore, the principal object of this invention to provide a stable system for making eccentricity and thickness measurements accurately by using capacitance to ground measurements.

Applicant accomplishes his object by utilizing a system in which two probes or electrodes are positioned on opposite sides of the cable whereby each of these electrodes have a capacitance to the metal sheath of the cable, and therefore to ground, which is a function of the thickness of the insulating covering. These probes are slidably positioned against the cable so that the measurements may be made continuously while the cable is being processed. The above mentioned two capacitances form two arms of an A. C. impedance bridge having a phase sensitive indicator circuit. The effects of the stray capacitance to ground and other sources of instability are eliminated by providing a neutral electrode in the form of shielding extending around the bridge arms and electrodes and connecting this shielding to the high potential terminal of the indicating circuit. Eccentricity of the insulating covering is indicated by an unbalance of the bridge due to the different capacitances existing between the two electrodes and the grounded metal sheath since the capacitance of each arm is a function of the thickness of the insulating covering between its electrode and the metal sheath.

The variation in the thickness of the insulating covering from a predetermined standard thickness is obtained by slightly modifying the above system. Since the capacitance between the electrode and the metal sheath is inversely proportional to the thickness of the insulating covering, a shielded grounded standard condenser is substituted for one of the electrodes and the indicating means are calibrated to read the variations in thickness of the covering directly.

Other objects and advantages will be apparent from the following detailed description taken in conjunction with the accompanying drawing, in which:

Fig. 1 is a schematic diagram of a system embodying the invention;

Fig. 2 is a vector diagram to be used with the explanation of the phase discriminator circuit of Fig. 1; and Fig. 3 is a modification of the bridge portion of Fig. 1 to adapt the system for measurements of thickness.

Referring now to the drawing, Fig. 1 discloses a four terminal A. C. impedance bridge having terminals A, B, C and D. This bridge is supplied with alternating current from the oscillator source 1, having a frequency of about 10 kilocycles, through transformer 2 to the A.-C. corners of the bridge. This transformer is wound so that the secondary windings 4 and 5 are exactly equal and nearly perfectly coupled so that potentials induced from the primary into windings 4 and 5 will be equal in magnitude and phase; furthermore, because of the high degree of coupling between windings 4 and 5, capacitances shunting either of these secondaries will have a negligible effect on this potential balance. The other two branches of the bridge, A—D and C—D, comprise the effective capacitances 19 and 20 respectively between the electrodes or probes 9 and the grounded metal sheath 7 of the cable 6, the dielectric of the effective capacitances being the insulating covering 8 of the cable. These probes are preferably of the type disclosed in copending application, Serial No. 308,878, filed by B. M. Wojciechowski on even date herewith. A shielding 18, connected to the B corner of the bridge, surrounds the ratio arms, the probes 9 (except for the contacting surfaces) and the connecting leads 27 and 28. This shielding arrangement reduces the stray admittances-to-ground from the measuring electrodes 9 to an insignificant quantity. The admittances from the measuring electrodes 9 to the B shielding 18 are not critical since these admittances appear across the coil branches of the bridge and as a result of the close magnetic coupling between these arms, any loading effects across them are symmetrically reflected at the A and C corners of the bridge, therefore, essentially not affecting the bridge balance. Stray admittances from the B shielding 18 to ground, appear across the opposite corners B and D, the detector diagonal, and therefore, they also have negligible effect on the circuit balance.

In the bridge described above, not only are the residual capacitances between the measuring electrodes 9 and ground reduced to a desirable minimum (actually below one micromicrofarad, including the effects of the associated networks) but also any adverse capacitance effects of the cables 27 and 28 are practically eliminated, even though these cables may be many feet long.

The indicator connected across the B—D diagonal of the bridge is a phase sensitive detector system which indicates both the amount and direction of unbalance deviation needed for determining the degree of eccentricity. This indicator comprises a phase discriminator circuit 21 having a reference voltage $f$—$g$ supplied across the balanced secondary winding of transformer 3 from oscillator 1 (which supplies the alternating current to the bridge) through an adjustable phase shifter 10. Across this secondary winding, are connected the grids of two vacuum tubes 13 and 14 respectively, biased close to the cut-off point (by selection of suitable cathode resistors 29). In another A. C. path, the unbalance signal from the bridge network (B—D diagonal) after amplification in a high stability A. C. amplifier 11, is applied to the center point $h$ of the transformer 3, across the grounded resistor 12. As can be seen on the vector diagram of Fig. 2, the potentials $f$—$j$ and $j$—$g$ which are applied across the grid circuit of the vacuum tubes, represent the sum or difference, respectively, of half of the reference potential $h$—$f$ or $g$—$h$ and the unbalance potential $h$—$j$. Depending upon the phase angle between the reference and the unbalanced potentials, one of the two vacuum tube grids will receive a voltage amplitude higher than the other causing a D. C. unbalance of corresponding polarity across the plates of these discriminator tubes 13 and 14. This D. C. unbalance is amplified in a D. C. amplifier 15 which isolates the discriminator from the attenuator 23 and recorder type indicator 17.

The use of the attenuator network 23 together with the A. C. amplifier 11 between the bridge and discriminator circuits increases the stability of the system so that zero and non-linear drifts, inherent with the D. C. amplifier 15 in the output of the discriminator circuit are minimized. The unbalance signal is amplified, in excess of conventional need, as an A. C. signal in the amplifier 11 which is highly stabilized by feedback. Then, after the signal is transformed and amplified as a D. C. polarized signal, it is subsequently attenuated to bring the signal level down, thereby minimizing the error of the D. C. amplifier 15.

By adjusting the phase shifter 10 properly, the unbalance signal coming from the bridge as a result of capacitance unbalance is oriented in phase with the reference potential $g$—$f$ at the input of the discriminator tubes 13 and 14. Under this condition, the conductance sensitivity of the discriminator is very low and at the same time high capacitance sensitivity is maintained.

For convenience in making phase adjustments, a conventional rectifier type null indicator 16 is provided.

The system as described may be used to indicate eccentricity directly simply by calibrating the zero center indicator means. Two test sets of this type may be used for making observations of the cable eccentricity in axes normal to one another.

In order to utilize the same system for making thickness measurements, the bridge circuit is modified as shown in Fig. 3. In this circuit, a grounded standard condenser 22 is connected in the A—D branch in place of the electrode 9 of the A—D branch of Fig. 1. The indicator 17 may then be calibrated to read thickness variations directly.

Although the basic bridge and phase discriminator circuits have been described as a particular type, it is, of course, possible to use circuits other than those described and still utilize the principles of the invention. It is, therefore, to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A system, for measuring the eccentricity of an insulating sheath on a metal tube which is at substantially ground potential, comprising a pair of stationary electrodes mounted in spaced positions on the sheath, connections between the electrodes and a source of alternating current forming an impedance bridge in which the capacitances between the electrodes and the metal tube are respectively two adjacent bridge arms, a phase discriminating indicator circuit connected between the junction point of the other two arms of the bridge and the metal tube, and an electrostatic shield for the bridge electrically connected to the junction point.

2. In a system for measuring the eccentricity and thickness of an insulating sheath on a metal tube which is at substantially ground potential, at least one stationary electrode slidably mounted on the sheath, a 4-terminal alternating current impedance bridge comprising a first pair of adjacent arms which are capacitance arms whose junction is at ground potential, the capacitance of at least one of said arms being the capacitance between the stationary electrode and the metal tube, a second pair of adjacent impedance arms serially connected to the ends of the first pair, an electrostatic shield for the bridge electrically connected to the junction point between the arms of the said second pair, a phase sensitive detector connected between the said two junctions and a source for applying alternating potential to the junctions connecting the two pairs of arms.

3. A system according to claim 2 having in the output of the detector, a D. C. amplifier, a high gain A. C. amplifier connected between the bridge and the detector, an indicator operated by the output of the D. C. amplifier and an attenuator between the D. C. amplifier and the indicator for minimizing the error due to the drift inherent in the D. C. amplifier.

4. A phase sensitive detector for an A. C. bridge, said bridge having input and output terminals, a source of alternating potential connected to the input terminals, said detector comprising a balanced phase discriminator circuit, a high gain A. C. amplifier connected between the said output terminals and the discriminator, a D. C. amplifier in the output of the discriminator, an indicator operated by the output of the D. C. amplifier and an attenuator between the D. C. amplifier and the indicator for minimizing the error due to the drift inherent in the D. C. amplifier.

5. In a system for measuring the thickness of an insulating sheath on a metal tube which is at substantially ground potential, a stationary electrode slidably mounted on the sheath, a 4-terminal alternating current impedance bridge comprising a first pair of adjacent arms which are capacitance arms whose junction is at ground potential, the capacitance of one of said arms being the capacitance between the stationary electrode and the metal tube, the other capacitance being a fixed condenser, a second pair of adjacent impedance arms serially connected to the ends of the first pair, an electrostatic shield for the bridge electrically connected to the junction point between the said second pair, a phase sensitive detector connected between the said two junctions and calibrated to indicate the amount of thickness variations of the sheath.

6. A system according to claim 5 having in the output of the detector, a D. C. amplifier, a high gain A. C. amplifier connected between the bridge and the detector, an indicator operated by the output of the D. C. amplifier and an attenuator between the D. C. amplifier and the indicator for minimizing the error due to the drift inherent in the D. C. amplifier.

7. In a system for measuring the thickness of a moving insulating layer on a metal body which is at substantially ground potential, a stationary electrode positioned over the layer, a 4-terminal alternating current impedance bridge comprising a first pair of adjacent arms which are capacitance arms whose junction is at ground potential, the capacitance of one of said arms being the capacitance between the stationary electrode and the metal body, the other capacitance being a fixed condenser, a second pair of adjacent, closely coupled transformer impedance arms serially connected to the ends of the first pair, an electrostatic shield for the bridge electrically connected to the junction point between the said second pair, and a phase sensitive detector connected between the said two junctions.

8. In a system for measuring the eccentricity and thickness of a moving insulating sheath on a metal tube which is at substantially ground potential, at least one stationary electrode positioned over the sheath, a 4-terminal alternating current impedance bridge comprising a first pair of adjacent arms which are capacitance arms whose junction is at ground potential, the capacitance of at least one of said arms being the capacitance between the stationary electrode and the metal tube, a second pair of adjacent, closely coupled transformer impedance arms serially connected to the ends of the first pair, an electrostatic shield for the bridge electrically connected to the junction point between the arms of the said second pair, a phase sensitive detector connected between the said two junctions and a source for applying alternating potential to the junctions connecting the two pairs of arms.

References Cited in the file of this patent

UNITED STATES PATENTS

| | | |
|---|---|---|
| 1,984,166 | Walter | Dec. 11, 1934 |
| 2,274,735 | Peters et al. | Mar. 3, 1942 |
| 2,285,152 | Firestone | June 2, 1942 |
| 2,307,499 | Frakes | Jan. 5, 1943 |
| 2,535,027 | Anderson | Dec. 26, 1950 |
| 2,604,512 | Bacon et al. | July 22, 1952 |